Sept. 28, 1943.  S. S. SMITH  2,330,755
PIPE LINE CONTROL SYSTEM
Filed Aug. 29, 1942  2 Sheets-Sheet 2
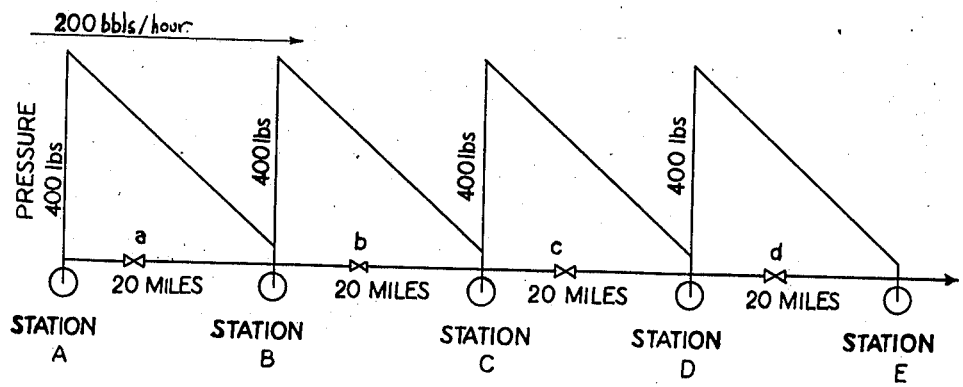
Fig II
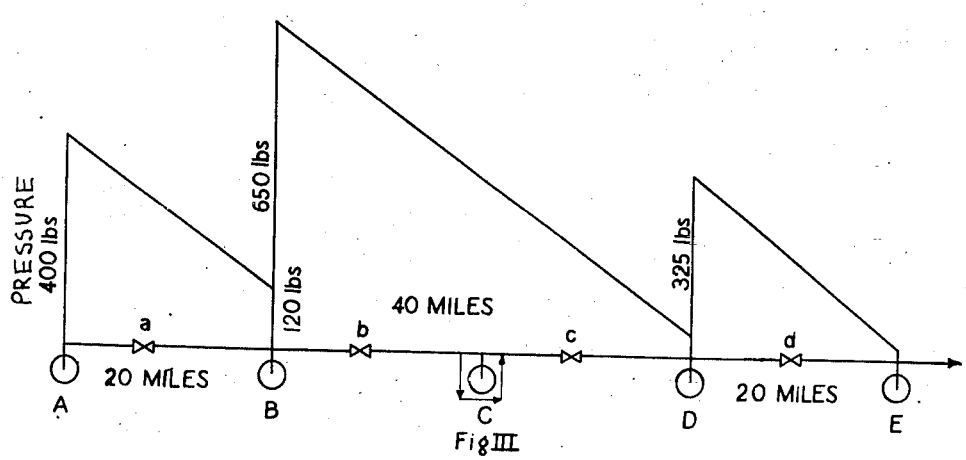
Fig III
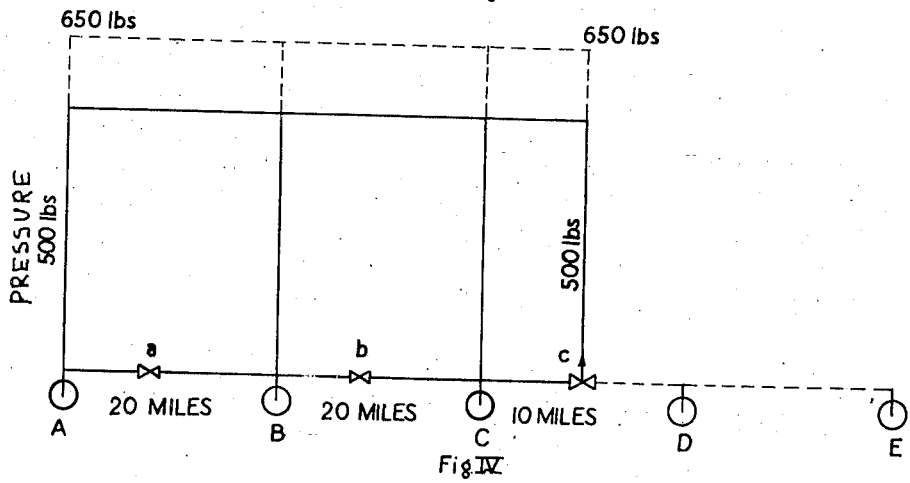
Fig IV
Inventor: Sydney S. Smith
By His Attorney Patented Sept. 28, 1943

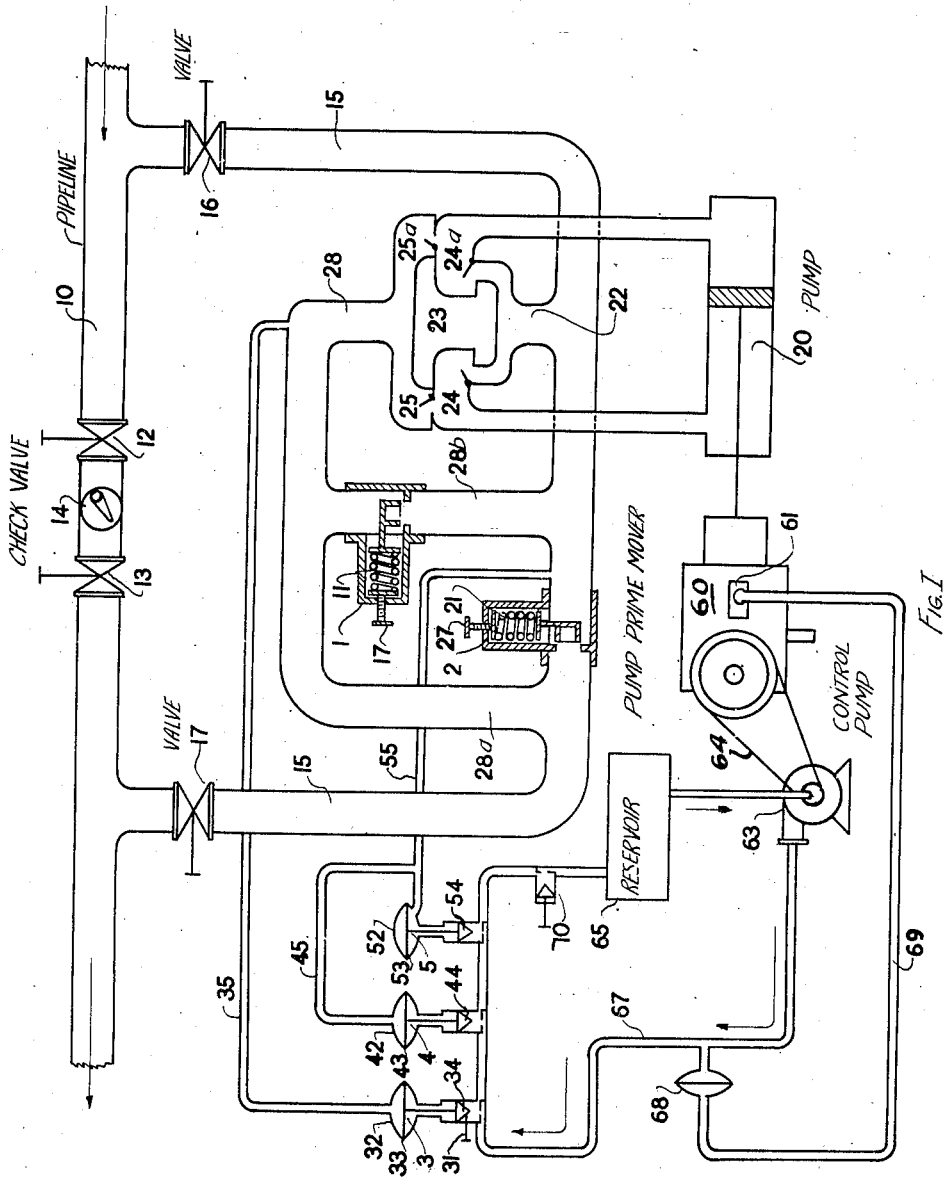
Fig. I

2,330,755

UNITED STATES PATENT OFFICE 2,330,755

PIPE-LINE CONTROL SYSTEM

Sydney S. Smith, Scarsdale, N. Y., assignor to Shell Development Company, San Francisco, Calif., a corporation of Delaware Application August 29, 1942, Serial No. 456,723

4 Claims. (Cl. 103—11)

This invention pertains to pipe line control systems, and relates more particularly to an automatic system of control for pipe line pumping stations.

The present control system is particularly suitable for pipe lines which can be rapidly constructed from readily available standard materials and equipment, such lines being useful in following moving army fronts, supplying advance air fields or supply depots, or, in general, conveying gasoline, fuel, or any other liquid, such as water, to difficultly accessible places, or to places where a shortage of these commodities may have developed.

A pipe line system of this type will in general comprise a suitably coupled pipe line adapted to be laid directly on the ground at a rapid rate, gate and check valves in the line at suitable intervals to permit the liquid flow to be stopped at any desired point in case of emergency, and pumping stations mounted on movable units such as trucks or trailers and spaced from each other at distances such, for example, as twenty miles along the line.

It is a particular object of this invention to provide an automatic control system for pipe lines of the type defined above, whereby pipe line pressures and pumping rates are functionally controlled by the pipe line pressures.

It is also an object of this invention to provide for the purposes of this control a system comprising, in combination, pressure-responsive by-pass valves and pressure-responsive speed regulators for the pipe line pumping equipment.

It is also an object of this invention to apply the above control system to pipe lines in such a manner that the flow therein may be stopped at any desired point without generating undesirable pressures exceeding a predetermined maximum value; that the pipe line may be maintained at a desired pressure as a closed system under stopped flow conditions; and that the pipe line flow may be restarted without creating undesirable pressure drops or voids with attendant runaways of the pumping equipment.

It is also an object of this invention to apply the above control to a pipe line system comprising a plurality of spaced pumping stations in such a manner that the system normally operates at a predetermined flow rate with all pumping stations in operation, and automatically readjusts itself to a lower predetermined flow rate when a pumping station or any number of non-adjacent pumping stations are not in operation.

It is also an object of this invention to provide for the above purposes an arrangement of control apparatus of rugged and simple construction adapted to be installed on a movable base together with other pumping station equipment, and requiring for its operation no other source of power except that available at said pumping station.

It is, however, understood that although the present invention is described in connection with a pump line of the particular type defined above, it is in no regard limited to pipe lines of said type, but may be used to control pressures and flow or pumping rates in pipe lines of any desired type or capacity.

Other objects and features of this invention will be understood from the following description, taken with reference to the attached drawings, wherein:

Fig. 1 is a schematic diagram of the present control system in application to a pipe line pumping station;

Figs. 2, 3 and 4 are pressure diagrams illustrating the operation of the present system under different sets of conditions.

Referring to the drawings, Fig. 1 shows a pumping station installation on a pipe line 10, provided with a check valve 14 and gate valves 12 and 13, the direction of flow being indicated by arrows.

A conduit 15 by-passes said valves and is connected to the pipe line 10 through gate valves 16 and 17.

A pump, preferably such as a duplex double-acting piston reciprocating pump schematically shown at 20, takes suction on the conduit 15 through an inlet passage 22, and delivers the fluid under pressure, by means of a vlave box 23 comprising inlet valves 24 and 24a, and discharge valves 25 and 25a, through a discharge passage or pipe 28.

The passage 28 has two branches 28a and 28b, opening in parallel to the conduit 15 downstream of the inlet passage 22, the suction and the pressure sides of the pump being separated from each other by control or relief valves schematically shown at 1 and 2, valve 1 being located in the passage or branch 28b, valve 2 in the conduit 15 between the points at which branches 28a and 28b open to said conduit.

Valves 1 and 2 are normally closed, and are of the pressure-responsive, preferably spring-loaded diaphragm type, although piston-type valves, such as shown for simplicity in the drawings, may equally well be used.

Valve 1 is responsive to pressures in the outlet passage 28, that is, to the pump discharge pressure, and its loading spring 11 may be pre-set or adjusted, by means such as diagrammatically shown in the form of a regulating screw 17, to cause said valve to open when the discharge pressure reaches a predetermined high value.

Valve 2 is responsive to pressures in that portion of the conduit 15 which is in communication with the inlet passage 22, that is, to the pump suction pressure, and its loading spring 21 may be pre-set or adjusted, by means such as diagrammatically shown in the form of a regulating screw 27, to cause said valve to open when the suction pressure reaches a predetermined high value.

The pump 20 is actuated by a prime-mover 60, having a speed-regulator mechanism 61 responsive to control means to be described hereinbelow, whereby said prime-mover and pump are automatically maintained at a speed suitable for a particular phase of operations of the present system.

The speed regulator 61 may be of any desired type depending on the type of the prime-mover used. Thus, with steam, gasoline or Diesel engines, the regulator 61 may be a throttle, carburetor or fuel-injector device; with electric motors, it may be a field rheostat, etc.

The control system for the speed regulator of the prime-mover comprises an auxiliary or control pump 63, driven through a gear system, chain or belt 64 from a suitable actuating part of the prime-mover 60.

The pump 63 forms part of a closed circuit comprising a reservoir 65 and a pipe 67 connected to said reservoir and to the intake and discharge of the pump 63.

The system of pump 63, reservoir 65 and pipe 67 is filled with a relatively small quantity, such, for example, as one gallon, of a suitable liquid, such as lubricating oil, which is circulated through the reservoir 65 between the discharge and the intake of pump 63.

The control system is connected, by means such, for example, as a liquid-filled pipe 69, comprising a diaphragm device 68, with the speed regulator 61 of the prime-mover.

A variable orifice, such as an adjustable needle valve schematically shown at 70, is inserted in pipe 67.

It will be understood that when the needle-valve is adjusted to an opening of predetermined size and the engine 60 runs at a constant speed, any tendency of the engine to speed up will result in an increased throughput of the control pump 63, which in turn will cause a greater pressure drop across the orifice 70, and a higher pressure in that portion of the pipe 67 between the discharge of the pump 63 and the orifice 70. This pressure will be transmitted, by means of the diaphragm 68 and pipe 69, to the speed regulator 61, and will actuate the latter to reduce the speed of the prime-mover 61, thus bringing it back to normal speed.

In a similar way, a reduction in the speed of the prime-mover is corrected and brought back to normal through a decrease of pressure in the circuit of pump 63.

In addition to the orifice 70, the circuit of pump 63 is provided with three more diaphragm-controlled variable orifices or needle valves schematically shown at 3, 4, and 5, which are responsive to pressures on the discharge or suction sides of the main pump 20, and serve to regulate the speed of the prime-mover as a function of said pressures.

The three units 3, 4 and 5 are installed in series in the pipe 67 between the discharge of the control pump 63 and the variable orifice 70. Each of these units comprises a housing 32, 42 and 52, respectively, containing a diaphragm, 33, 43 and 53, carrying on one side a valve stem or needle, 34, 44 and 54, adapted to restrict the flow through the pipe 67.

In unit 3, the other side of the diaphragm is in communication, through a pipe 35, with the pressure in pipe 28, that is, with the discharge pressure of the pump 20. Unit 3, therefore, restricts the flow through the pipe 67 with increasing discharge pressures of the pump 20.

In unit 4, the other side of the diaphragm is in communication, through pipes 45 and 55, with the pressure in pipe 15, that is, with the suction pressure of the pump 20. Unit 4, therefore, restricts the flow through the pipe 67 with increasing suction pressures of the pump 20.

In unit 5, the same side of the diaphragm 53 which carries the control stem 54 attached thereto is in communication with the suction side of pump 20. Unit 5, therefore, restricts the flow through pipe 67 with decreasing suction pressure of the pump 20.

Each of the units 3, 4 and 5 is separately adjustable for closing the passage through pipe 67 to an aperture smaller than that to which the orifice of control 70 had been set. These units are thus independently capable of restricting the flow in the pipe 67 to an adjustable value smaller than that permitted by the control 70.

When any of the units 3, 4 and 5 closes to such small aperture size in response to discharge or suction pressure variations of the main pump 20, the resulting increased pressure in the pipe 67 acts through the diaphragm 68 to slow down the prime-mover 60. Thus, any one or a combination of said control units can slow or throttle the prime-mover below its normal operating speed, or, in certain cases, completely stop said prime-mover.

The high discharge pressure control 3 is adjusted to throttle the prime-mover when the discharge pressure of the pump 20 reaches a high value slightly below that at which the high pressure relief valve 1 is set to operate. For example, if the relief valve 1 is set to open at a discharge pressure of 650 lbs., the control 3 may be set to throttle the prime-mover at a discharge pressure of 625 lbs. The control 3 may, however, be provided with an adjustable stop 31, so that the minimum speed of the prime-mover under the effect of said controller is reduced to a predetermined fraction, such for example, as one-half of its normal speed. This prevents the engine from stopping, and, if the line is closed somewhere downstream of the station, insures that the engine will run at a sufficient speed to permit the pressure to build above the 625 lbs. point and up to a 650 lbs. pressure, thus causing the relief valve to operate, as will be described hereinbelow.

The high suction pressure control 4 is adjusted to throttle the prime-mover when the suction pressure rises just above the point where the high suction relief valve 2 opens. For example, if the valve 2 is set to open at a suction pressure of 400 lbs., the control 4 may be set to operate at 425 lbs., at which point it will slow the prime-mover to an idling speed, where it will operate without doing work on the line (the high suction relief valve 2 being open and permitting recirculation around the pump), until the pressures at the pump station are reduced to normal values.

The diaphragm unit 5 controls the pump in normal operation. This unit is responsive to the low suction pressures of the pump 20, and is adapted to close as the suction pressure decreases. Thus, as the pressure falls, the engine slows to a point where it is just able to maintain a 10 lbs. suction pressure, and the pump operates to pump exactly the same amount of liquid it receives from the line.

The operation of the above control system will be described with regard to a pipe line schematically illustrated by the diaphragms of Figs. 2, 3 and 4.

Such pipe line may consist, by way of an illustrative example, of a 4-inch diameter spiral welded pipe provided with so-called "Victaulic" couplings, and having pump-stations of the type described above spaced at distances of approximately 20 miles from each other, as shown at A, B, C, D and E. The pipe line is likewise provided with gate valves $a$, $b$, $c$ and $d$, installed at regular intervals and also at points such as road, river or railroad crossings, steep grades, and other points exposed to hazard, whereby the flow in the pipe line may be stopped at any desired point.

Such line, with the stations equipped with proper high pressure pumps and prime-movers, may be adapted to handle gasoline at a basic flow rate of about 200 barrels per hour with all stations running, or at some other desired rate, such, for example, as 175 or 165 barrels per hour with any number of stations shut down, provided the no two adjacent stations are shut down. The line pressure drop will be about 20 lbs./sq. in. per mile at the 200 bbls./hr. flow rate, and of 14 lbs./sq. in. at the 165 bbls./hr. flow rate.

If the theoretical line of five stations and intervening and downstream sections shown in Fig. 2 is considered, all possible combinations of operating conditions can be readily analyzed and determined, and the results and conclusions will hold true for any number of further sections which may be added to the pipe line. The effect of possible intermediate withdrawals is neglected, since it results merely in reducing pressures and simplifying operations.

With all the stations running, the first station A is adjusted to operate at about 400 lbs. discharge pressure, which is provided by the line resistance of about 20 lbs. per mile for the 20-mile section between stations A and B, the line delivering 200 barrels per hour. Each of the succeeding stations will operate in the same manner, the high pressure and suction relief valves 1 and 2 being closed and the prime-mover and pump being maintained under control by the adjustable orifice control 70 and the low-suction throttle control 5 at a proper speed and a suction pressure of about 10 lbs.

With stations A and B operating continuously, and one of the stations, for example, station C, shut down, the operation of the line is shown in Fig. 3.

Station A will operate, as in the first case, at a discharge pressure of 400 lbs. Since, due to the failure of station C, the line is capable of delivering only about 165 bbls. per hour, the pressure drop over the 20-mile section A—B at a rate of 14 lbs. per mile will be 280 lbs., and station B will operate at a suction pressure of 120 lbs. and at or near its maximum discharge pressure, such as from 580 to 625 lbs., because station A is trying to deliver 200 bbls. per hour, while the downstream stations are taking only about 165 bbls. per hour.

Station C will be by-passed through open valve 12, 13 and 14, valves 16 and 17 shown in Fig. 1 being closed. Station D will operate on its low suction throttle control 5, at about 10 lbs., the engine and the pump slowing down to handle about 165 bbls. per hour. The discharge pressure of station D will be about 280 to 325 lbs., as required to pump to station E. Station E will operate in a manner similar to that of station D.

Substantially the same mode of operation will prevail if any other station, such for example, as D, is temporarily cut out of the line.

If, with all stations operating it, it becomes necessary due to an emergency, to shut down the whole line by closing, for example, a valve $c$ between stations C and D, as shown in Fig. 4, the station C will come up to a discharge pressure of 625 lbs., at which point the high discharge throttle control 4 will operate, slowing down the prime-mover 60. The discharge pressure will, however, continue rising until it reaches 650 lbs., at which point the high discharge relief valve 1 will open, permitting the discharge liquid to circulate back to the suction side of the pump through the pipe 28b, and thus raising the suction pressure of the station towards the value of the station discharge pressure. At 400 lbs. suction pressure the high suction relief valve 2 will open, completely equalizing the discharge and the suction pressure of the station. The suction pressure being thus brought higher than 425 lbs., the high suction throttle control 4 will operate, bringing the prime-mover to idling speed, whereby the work done by the pump 20 will be limited to recirculating the liquid from the discharge to the suction side.

The sequence of automatic operations described with regard to the station C is consecutively repeated at stations B and A, when the pressure rise due to the closure of the valve $c$ reaches these stations. A proper adjustment of the stop 31 on the high discharge throttle control 3 of the station A causes said station to maintain the whole system up to the blocked valve $c$ at a desired pressure, such as 500 lbs.

Stations D and E lose suction and are brought to a stop by the low suction throttle control 5.

When the closed gate valve $c$ is reopened, the high pressure on the upstream side of said valve passes to the downstream side, raising the suction pressure of the downstream stations D and E, which thereupon resume operations.

At the same time, the pressure of the next upstream station C, which had been maintained at a high value such as 500 lbs., begins to drop until the suction pressure of said station is sufficiently low to open the high suction throttle control 4 and close the high suction relief valve 2 (which will happen respectively at 425 and 400 lbs.) whereupon the station will resume operations on normal control basis. This reduction of pressure will similarly affect each successive upstream station, each of said stations in turn resuming pumping until the operation of the whole system is again normal.

If two adjacent stations, for example, B and C, are shut down simultaneously, and the previous upstream station, A, is not able to pump through these two stations to the next downstream station, D, the same sequence of operations will take place as described for the case of a valve c shutting down the line.

It will thus be seen that the present invention provides a flexible system of pipe line control, whereby a line can be operated at any desired flow rate up to maximum pressure capacity, that is, for the example given hereinabove, within a range of from about three barrels per hour to about two hundred barrels or more per hour, said maximum capacity depending on the actual line resistance.

If desired, withdrawals of the liquid may be effected at any desired points along the line, the present automatic control always permitting the line to deliver to the end point such liquid as remains after withdrawals or after individual or multiple station shutdowns.

I claim as my invention:

1. In a pipe line system, the combination of a pipe line, a pump, a suction inlet connecting said pump with the pipe line, a discharge outlet having two parallel branches connecting said pump with two spaced points in the pipe line downstream of the inlet, normally closed pressure-actuated valve means in the outlet branch nearest the inlet adapted to open in response to a predetermined high discharge pressure, and normally closed pressure-actuated valve means in the pipe line between the two outlet branches adapted to open in response to a predetermined high suction pressure.

2. In a pipe line system, the combination of a pipe line, a conduit connected in parallel with said pipe line at spaced points thereof, a valve adapted to close the pipe line between said points, a pump, an inlet passage between the suction side of said pump and said conduit, an outlet passage having two parallel branches between the discharge side of said pump and two spaced points of said conduit downstream of the inlet passage, normally closed valve means in the outlet branch nearest the inlet, adjustable means responsive to a predetermined high discharge pressure adapted to open said valve, normally closed valve means in said conduit between said two outlet branches, and adjustable means responsive to a predetermined high suction pressure adapted to open said valve.

3. In a pipe line system, the combination of a pipe line, a conduit connected in parallel with said pipe line at spaced points thereof, a valve adapted to close the pipe line between said points, a pump, a prime-mover for said pump, an inlet passage between the suction side of the pump and said conduit, an outlet passage having two parallel branches between the discharge side of said pump and two spaced points of said conduit downstream of the inlet passage, normally closed pressure-actuated first valve means in the outlet branch nearest the inlet adapted to open in response to a predetermined high discharge pressure, normally closed pressure-actuated second valve means in said conduit between the two outlet branches adapted to open in response to a predetermined high suction pressure, a speed regulator for the pump prime-mover, pressure-actuated control means adapted to cause said regulator to reduce the speed of the prime-mover in response to a predetermined high discharge pressure, said pressure being below that required to open said first valve means, pressure-actuated control means adapted to cause said regulator to reduce the speed of the prime-mover in response to a predetermined high suction pressure, said pressure being above that required to open said second valve means, and pressure-actuated control means adapted to cause said regulator to reduce the speed of the prime-mover in response to a predetermined low suction pressure.

4. In a pipe line system, the combination of a pipe line, a conduit connected in parallel with said pipe line at spaced points thereof, a valve adapted to close the pipe line between said points, a pump, a prime-mover for said pump, an inlet passage between the suction side of the pump and said conduit, an outlet passage having two parallel branches between the discharge side of said pump and two spaced points of said conduit downstream of the inlet passage, normally closed pressure-actuated first valve means in the outlet branch nearest the inlet adapted to open in response to a predetermined high discharge pressure, normally closed pressure-actuated second valve means in said conduit between the two outlet branches adapted to open in response to a predetermined high suction pressure, a speed regulator for the pump prime-mover, a control pump driven by said prime-mover, a closed liquid circuit between the suction and the discharge sides of said control pump, adjustable orifice means adapted to restrict the flow in said circuit, diaphragm-controlled orifice means responsive to high pipe line pump discharge pressure adapted to restrict the flow in said circuit, diaphragm-controlled orifice means responsive to high pipe line pump suction pressure adapted to restrict the flow in said circuit, diaphragm-controlled orifice means responsive to low pipe line pump suction pressure adapted to restrict the flow in said circuit, the pressure in said circuit at a particular pumping rate varying as a function of the flow therethrough, and diaphragm means responsive to the pressure in said circuit adapted to actuate the speed regulator of said prime-mover, whereby the speed of said prime-mover is varied.

SYDNEY S. SMITH.